United States Patent
Tamai et al.

(10) Patent No.: US 8,412,043 B2
(45) Date of Patent: Apr. 2, 2013

(54) OPTICAL COMMUNICATIONS NETWORK, POWER SUPPLY CONTROLLING METHOD, STATION-SIDE EQUIPMENT, SUBSCRIBER-SIDE EQUIPMENT, AND SEMICONDUCTOR CHIP

(75) Inventors: Hideaki Tamai, Saitama (JP); Yasuyuki Kuroda, Chiba (JP)

(73) Assignees: Oki Electric Industry Co., Ltd., Tokyo (JP); OF Networks Co., Ltd., Chiba (JP)

( * ) Notice: Subject to any disclaimer, the term of this patent is extended or adjusted under 35 U.S.C. 154(b) by 327 days.

(21) Appl. No.: 12/805,770

(22) Filed: Aug. 19, 2010

(65) Prior Publication Data
US 2011/0076022 A1    Mar. 31, 2011

(30) Foreign Application Priority Data
Sep. 30, 2009    (JP) ................. 2009-226731

(51) Int. Cl.
*H04J 14/00*    (2006.01)
(52) U.S. Cl. ........... 398/71; 398/70; 398/66; 398/58
(58) Field of Classification Search ............ 398/72, 398/71, 70, 66, 58
See application file for complete search history.

(56) References Cited

U.S. PATENT DOCUMENTS
7,599,623 B2 * 10/2009 Stock et al. .............. 398/74
7,609,966 B2 * 10/2009 Gumaste et al. .......... 398/59
7,751,711 B2 * 7/2010 Wynman ................... 398/72
8,014,674 B2 * 9/2011 Gao et al. .................. 398/72

OTHER PUBLICATIONS
"Technical Basics Lesson: GE-PON Technology", NTT GIJUTU Journal (NTT Technical Journal), 2005 vol. 17 No. 8, Aug. 2005.

* cited by examiner

*Primary Examiner* — M. R. Sedighian
(74) *Attorney, Agent, or Firm* — Rabin & Berdo, P.C.

(57) ABSTRACT

An optical communications network that is composed of one station-side equipment being connected to plural subscriber-side equipments. The station-side equipment refers to downstream data signals and prepares transmission plans, and generates downstream control signals that include the transmission plans, and converts downstream signals, that include the downstream data signals and the downstream control signals to which identifiers indicating the subscriber-side equipments that are addressees are assigned, into downstream optical signals, and sends the downstream optical signals out toward the subscriber-side equipments. The subscriber-side equipment converts downstream optical signals into downstream electric signals, and refers to identifiers and extracts downstream electric signals addressed to itself, and reads the transmission plans, and generates timer control signals including information of receiving start times and receiving stop times, and, on the basis of the timer control signals, opens and closes a path connecting a receiving section and an electricity supply section.

12 Claims, 3 Drawing Sheets

OPTICAL COMMUNICATIONS NETWORK, POWER SUPPLY CONTROLLING METHOD, STATION-SIDE EQUIPMENT, SUBSCRIBER-SIDE EQUIPMENT, AND SEMICONDUCTOR CHIP

CROSS-REFERENCE TO RELATED APPLICATION

This application claims priority under 35 USC 119 from Japanese Patent Application No. 2009-226731 filed on Sep. 30, 2009, the disclosure of which is incorporated by reference herein.

BACKGROUND OF THE INVENTION

1. Field of the Invention

The present invention relates to an optical communications network, and to a passive optical subscriber network in particular, and relates to a power supply controlling method, a station-side equipment, a subscriber-side equipment, a semiconductor chip of a station-side equipment, and a semiconductor chip of a subscriber-side equipment in the optical communications network.

2. Description of the Related Art

A telecommunications network that connects a building (operator's office) owned by a telecommunications operator and homes of subscribers is called an access network. Due to recent increasing communication capacities, employing optical communications, optical access networks that can transfer vast amounts of information are getting the mainstream.

A passive optical subscriber network (PON: Passive Optical Network) is one form of an optical access network. A PON consists of one station-side equipment that is installed within an operator's office, several subscriber-side equipments that are respectively installed within the homes of subscribers, and an optical splitter. The station-side equipment and the respective subscriber-side equipments are connected to the optical splitter with an optical fiber (refer to, for example, "Technical Basics Lesson: GE-PON Technology" in NTT GIJUTU Journal (NTT Technical Journal), August 2005).

The connection between the station-side equipment and the optical splitter is made by using a single-core optical fiber. This single-core optical fiber is shared with multiple subscriber-side equipments. Further, the optical splitter is an inexpensive passive equipment. In this way, a PON is extremely cost effective, and further, maintenance is also simple. Therefore, the introduction of PONs is proceeding rapidly.

Figure 3:
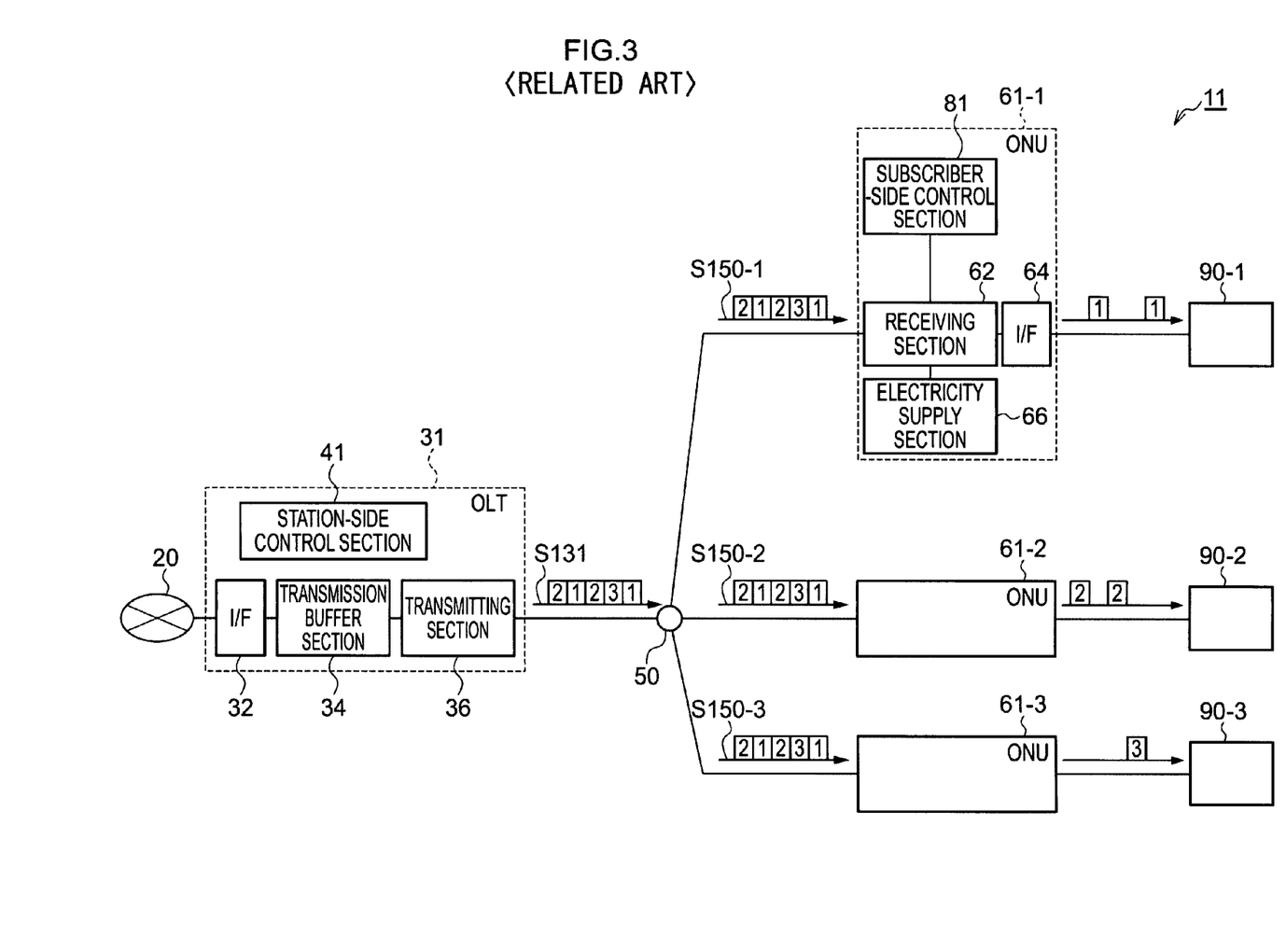
FIG. 3 is a schematic drawing of a conventional example of a TDM-PON.

Various types of multiplexing technologies are used in PONs. Typical multiplexing technologies that are used in PONs are Time Division Multiplexing (TDM) that allocates short slots on the time axis to each subscriber, Wavelength Division Multiplexing (WDM) that allocates different wavelengths to each subscriber, and Code Division Multiplexing (CDM) that allocates different codes to each subscribers, and the like. A TDM-PON, that uses TDM among these multiplexing technologies, is currently most widely used. The TDM-PON will be described with reference to FIG. 3. FIG. 3 is a schematic diagram for explaining for explaining a conventional example of a TDM-PON.

A PON 11 that is an optical communications network has a station-side equipment (OLT: optical line terminal) 31 and subscriber-side equipments (ONUs: optical network units) 61-1 through 61-3. The OLT 31 and the respective subscriber-side equipments 61-1 through 61-3 are connected with an optical fiber via an optical splitter 50.

Communication from the respective ONUs 61 toward the OLT 31 is called upstream communication. Further, communication from the OLT 31 toward the respective ONUs 61 is called downstream communication. Here, mainly downstream communication will be described, and detailed explanation of upstream communication and illustration of functional blocks needed for upstream communication are omitted.

The OLT 31 consists of an interface converting section (I/F) 32, a transmission buffer section 34, a transmitting section 36, and a station-side control section 41.

The interface converting section 32 carries out communications protocol processing with an upper network 20 serving as an external network. The interface converting section 32 converts downstream data signals, that are sent-in from the upper network 20, into downstream data signals of the format defined by PON protocol, and sends the converted data signals to the following transmission buffer section 34. The downstream data signals are signals to be transmitted from the upper network 20 to user equipments 90-1 through 90-3, i.e., are signals to be transmitted by downstream communications, and include information requested by users.

The transmission buffer section 34 accumulates, for a predetermined time period, the downstream data signals that have been sent from the interface converting section 32. After the predetermined time period elapses, the accumulated downstream data signals are sent to the transmitting section 36.

The station-side control section 41 generates downstream control signals, and sends them to the transmitting section 36. The control signals are signals that the OLT 31 and each ONU 61 exchange. The OLT 31 can send commands to each ONU 61 by transmitting downstream control signals to each ONU 61. Further, by receiving upstream control signals from each ONU 61, the OLT 31 can know of the statuses of the respective ONUs 61. In order to carry out stable communications, these control signals need to be transmitted and received periodically between the OLT 31 and the respective ONUs 61.

The transmitting section 36 assigns, to the downstream data signals and the downstream control signals, identifiers that indicate the destination ONU 61. These identifiers are allocated individually to the respective ONUs 61. By using the identifier, each ONU 61 can identify whether or not a received downstream signal (a downstream data signal or a downstream control signal) is addressed to itself.

After assigning identifiers to the downstream signals, the transmitting section 36 converts the downstream signals into downstream optical signals. The transmitting section 36 transmits the downstream optical signals toward the respective ONUs 61.

The ONU 61 consists of a receiving section 62, an interface converting section (IN) 64, an electricity supply section 66 and a subscriber-side control section 81.

The receiving section 62 has a photoelectric converting function, a signal extracting function, and a signal sorting function. The photoelectric converting function is the function of converting the downstream optical signals that are received from the OLT 31 into downstream electric signals. The signal extracting function is the function of reading the identifiers included in the downstream electric signals, extracting the signals that are addressed to itself, and discarding signals of other addresses. Further, the signal sorting function is the function of sorting the signals addressed to itself into downstream control signals and downstream data signals, and sending the downstream control signals to the subscriber-side control section 81, and sending the downstream data signals to the interface converting section 64.

The interface converting section 64 converts the downstream data signals into data signals of the format that is defined by the communications protocol with the user equipment 90. The converted downstream data signals are sent to the user equipment 90.

The electricity supply section 66 supplies electric power to the receiving section 62.

The subscriber-side control section 81 executes the commands described in the downstream control signals. For example, the transmission timing of an upstream signal is described in a downstream control signal. The subscriber-side control section 81 transmits the upstream signal in accordance with the transmission timing, and prevents collision of upstream signals from multiple ONUs.

The transmission of downstream signals is described next. The numbers given to the downstream signals in FIG. 3 express the identifiers that indicate the destination ONU. "1" indicates that the destination ONU is the first ONU 61-1. "2" indicates that the destination ONU is the second ONU 61-2. "3" indicates that the destination ONU is the third ONU 61-3.

The downstream optical signals (shown by arrow S131 in FIG. 3) that are time-division-multiplexed at the OLT 31 are branched at the optical splitter 50. The downstream optical signals that have been branched at the optical splitter 50 (shown by arrows S150-1 through S150-3 in FIG. 3) include the same contents before and after passing through the optical splitter 50. However, the strength of the downstream optical signal is reduced in accordance with the number of times the signals are branched at the optical splitter 50. The branched downstream signals are received at the respective ONUs 61. At each ONU 61, the identifier described in the downstream optical signal is compared with the identifier allocated to itself As a result of the comparison, signals that match are sent to the following user equipments 90, whereas signals that do not match are discarded.

However, in the above-described conventional PON, each ONU needs to receive all of the downstream optical signals that are sent-in from the OLT, whether or not the signals are addressed to itself. Each ONU carries out reading of the identifiers described in the downstream optical signals, identifying whether or not the signals are addressed to itself, and discarding signals that are addressed to others. Accordingly, even when there are no downstream optical signals addressed to itself at all, the ONU needs to carry out the receiving operation at all times, and as a result, electric power is consumed wastefully.

The downstream optical signals arrive at the ONU in greatly attenuated state by the branching at the optical splitter and the transmission over the optical fiber. Therefore, the receiving section of the ONU is composed of a circuit that consumes much power and amplifies the downstream signal whose strength is low. Accordingly, the proportion of the power consumption of the receiving section is larger compared to the power consumption of the entire ONU.

SUMMARY OF THE INVENTION

The present invention has been made in view of the above circumstances and provides an optical communications network, a power supply controlling method, a station-side equipment, a subscriber-side equipment, a semiconductor chip of a station-side equipment, and a semiconductor chip of a subscriber-side equipment.

According to an aspect of the invention, there is provided an optical communications network that is structured by one station-side equipment being connected to a plurality of subscriber-side equipments, the station-side equipment including: a transmission buffer section that accumulates downstream data signals received from an external network; a station-side control section that includes a transmission plan preparation unit that monitors the transmission buffer section and prepares transmission plans, and a control signal generation unit that generates downstream control signals that include the transmission plans; and a transmitting section that assigns, to the downstream data signals and the downstream control signals, identifiers that indicate the subscriber-side equipments that are addressees, and converts downstream signals, that include the downstream data signals and the downstream control signals, into downstream optical signals, and sends the downstream optical signals out toward the subscriber-side equipments in accordance with the transmission plans, and each of the plurality of subscriber-side equipments including: a receiving section that converts downstream optical signals, that are received from the station-side equipment, into downstream electric signals, and refers to identifiers assigned thereto and extracts downstream electric signals addressed to itself, and sends downstream control signals, that are included in the extracted downstream electric signals, to a subscriber-side control section; the subscriber-side control section that includes a transmission plan reading unit that reads the transmission plans included in the downstream control signals, and a timer control signal generation unit that generates timer control signals including information of receiving start times and receiving stop times of downstream optical signals addressed to itself; a timer that generates switch control signals that switch an on/off state of a switch on the basis of the timer control signals; an electricity supply section; and the switch that is provided between the receiving section and the electricity supply section, and that, on the basis of the switch control signals, opens and closes a path connecting the receiving section and the electricity supply section.

BRIEF DESCRIPTION OF THE DRAWINGS

Preferred embodiments of the present invention will be described in detail based on the following figures, wherein.

DETAILED DESCRIPTION OF THE INVENTION

This invention was made in view of above mentioned issues and its objective is to provide an optical communications network and a power supply controlling method that aims to reduce power consumption by turning the power supply of the receiving section of an ONU on while downstream optical signals addressed to itself that should be received are arriving, and by turning the power supply of the receiving section of the ONU off while downstream optical signals addressed to other ONUs which are not necessary to receive are arriving.

In order to achieve above mentioned objective, the optical communications network of the present invention, which consists of one station-side equipment being connected to multiple subscriber-side equipments, has the following structure.

The station-side equipment has a transmission buffer section, a station-side control section, and a transmitting section.

The transmission buffer section accumulates downstream data signals that are received from an external network. The station-side control section has a transmission plan preparation unit and a control signal generation unit. The transmission plan preparation unit monitors the transmission buffer section and prepares transmission plans. The control signal generation unit generates downstream control signals including the transmission plans. The transmitting section assigns, to the downstream data signals and the downstream control signals, identifiers that indicate the destination subscriber-side equipments, and converts the downstream signals, including the downstream data signals and the downstream control signals, into downstream optical signals, and sends the downstream optical signals out toward the subscriber-side equipments in accordance with the transmission plans.

The subscriber-side equipment has a receiving section, a subscriber-side control section, a timer, an electricity supply section, and a switch.

The receiving section converts downstream optical signals received from the station-side equipment into downstream electric signals, and, by referring to identifiers assigned thereto, extracts downstream electric signals that are addressed to itself, and sends downstream control signals included in the extracted downstream electric signals to the subscriber-side control section. The subscriber-side control section has a transmission plan reading unit and a timer control signal generation unit. The transmission plan reading unit reads transmission plans included in the downstream control signals. Based on the transmission plans, the timer control signal generation unit generates timer control signals that include information of receiving start times and receiving stop times of the downstream optical signals that are addressed to itself. Based on the timer control signals, the timer generates switch control signals that switch on/off the switch. The switch is placed between the electricity supply section and the receiving section, and opens and closes the path that connects the receiving section and the electricity supply section according to the switch control signals.

The power supply controlling method of the present invention in an optical communications network that consists of one station-side equipment being connected to multiple subscriber-side equipments, includes the following processes.

First, the station-side equipment accumulates downstream data signals that are received from an external network. Next, the station-side equipment refers to the downstream data signals accumulated in the transmission buffer section, and prepares transmission plans. Then, the station-side equipment generates downstream control signals that include the transmission plans. Next, the station-side equipment assigns, to the downstream data signals and the downstream control signals, identifiers that indicate the destination subscriber-side equipments. Then, the station-side equipment converts the downstream signals that include the downstream data signals and the downstream control signals, into downstream optical signals. Then, in accordance with the transmission plans, the station-side equipment sends the downstream optical signals out toward the subscriber-side equipments.

Thereafter, the subscriber-side equipment converts downstream optical signals that are received from the station-side equipment, into downstream electric signals. Then, the subscriber-side equipment refers to identifiers assigned thereto, and extracts downstream electric signals that are addressed to itself. Next, the subscriber-side equipment reads transmission plans included in the downstream control signals. Then, the subscriber-side equipment generates timer control signals that include information of receiving start times and receiving stop times of the downstream optical signals that are addressed to itself. Next, based on the timer control signals, the subscriber-side equipment opens and closes the path that connects the receiving section and the electricity supply section that are provided at the subscriber-side equipment.

According to the optical communications network of the present invention and the power supply controlling method in an optical communications network of the present invention, the station-side equipment prepares transmission plans and sends control signals that include the transmission plans to subscriber-side equipments. On the basis of the transmission plans, the subscriber-side equipments switch on/off the supply of electricity to the receiving sections. This enables the subscriber-side equipment to supply electricity to the receiving section only when downstream signals addressed to itself are being received, and to stop supplying electricity to the receiving section when downstream signals addressed to itself are not being received.

As a result, the power consumption of the subscriber-side equipment can be reduced compared with a conventional network in which electricity is supplied to the receiving section all the time. Further, because electricity is supplied to the receiving section while downstream signals addressed to itself are arriving, there are no loss of downstream signals addressed to itself.

Exemplary embodiments of the present invention are described hereinafter with reference to the drawings. However, the respective drawings are merely illustrations that schematically show the present invention to the extent that it can be understood. Further, the present invention is not limited to the following exemplary embodiments, and many changes and modifications that can achieve the effects of the present invention can be carried out without deviating from the scope of the structure of the present invention.

(Optical Communications Network)

Figure 1:
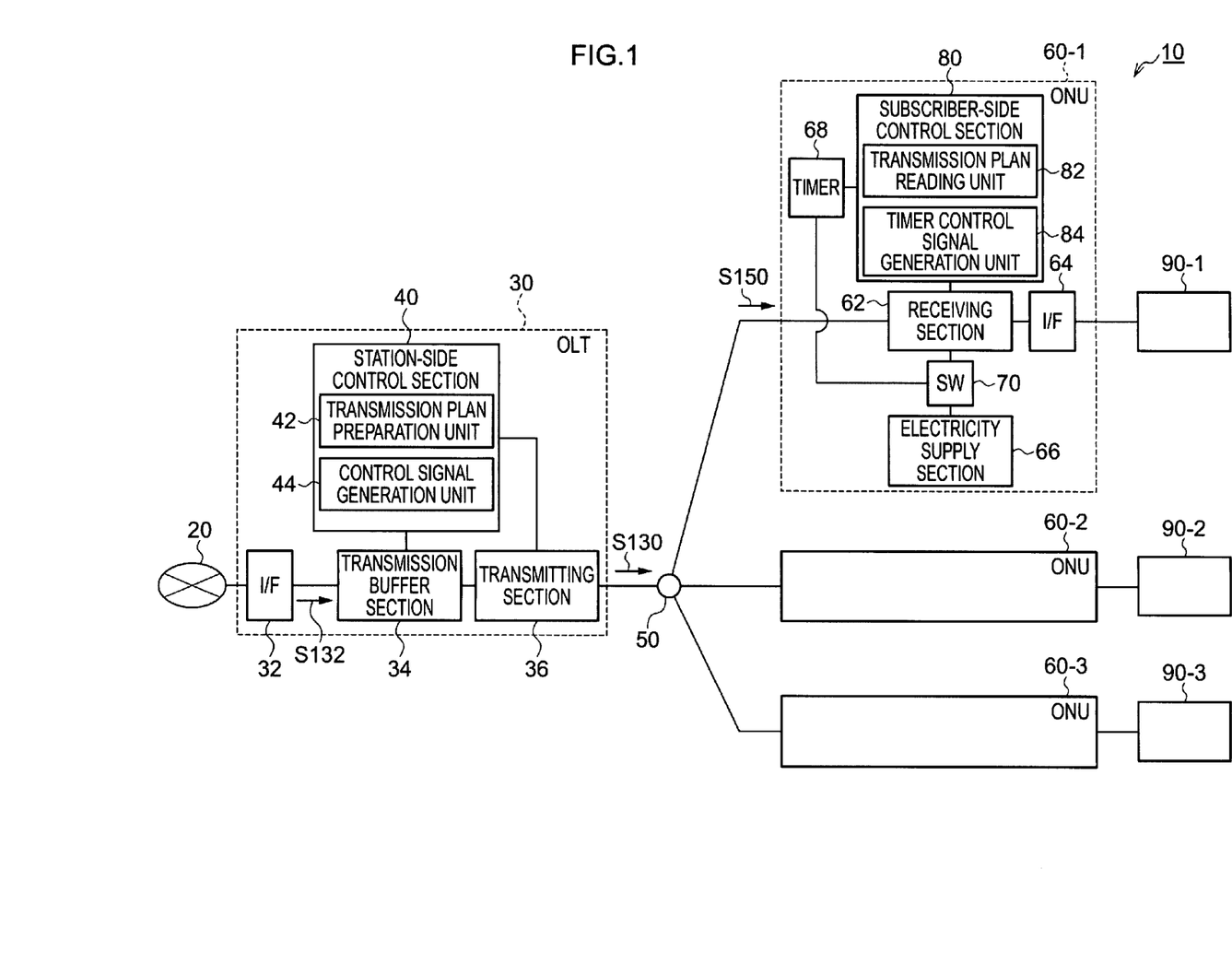
FIG. 1 is a schematic drawing of an optical communications network.

An optical communications network of the present invention is described with reference to FIG. 1. FIG. 1 is a schematic drawing showing a structural example of the optical communications network.

An optical communications network 10 of this structural example is a so-called PON that is composed of one station-side equipment (OLT: Optical Line Terminal) 30, and multiple subscriber-side equipments (ONUs: Optical Network Units) 60. Here, description is given with there being three of the ONUs 60 that consist the PON 10, but the number of ONUs that consist the PON 10 is not limited to three.

The OLT 30 and the respective ONUs 60-1 through 60-3 are connected with an optical fiber via the optical splitter 50. Communication from the respective ONUs 60-1 through 60-3 toward the OLT 30 is called upstream communication. Further, communication from the OLT 30 toward the respective ONUs 60-1 through 60-3 is called downstream communication. Here, mainly downstream communication will be described, and detailed explanation of upstream communication and illustration of functional blocks needed for upstream communication are omitted.

The OLT 30 consists of the interface converting section (I/F) 32, the transmission buffer section 34, the transmitting section 36, and a station-side control section 40. Note that the OLT 30 may be structured to have a semiconductor chip at which the interface converting section (I/F) 32, the transmission buffer section 34, the transmitting section 36, and the station-side control section 40 are formed.

The interface converting section 32 carries out communications protocol processing with the upper network 20 that is an external network. The interface converting section 32 converts downstream data signals, that are sent-in from the upper network 20, into downstream data signals of the format defined by PON protocol. The interface converting section 32 sends the converted downstream data signals to the transmission buffer section 34 that is a later stage. The downstream data signals are signals to be transferred from the upper network 20 to the user equipments 90-1 through 90-3, and are signals carrying information requested by users.

The transmission buffer section 34 accumulates, for predetermined time period T, the downstream data signals that have been received via the interface converting section 32. After the predetermined time period T elapses, the downstream data signals accumulated in the transmission buffer section 34 are sent to the transmitting section 36.

The station-side control section 40 has a transmission plan preparation unit 42 and a control signal generation unit 44. The control signal generation unit 44 generates downstream control signals, and sends them to the transmitting section 36.

Here, the control signals are signals that the OLT 30 and the ONUs 60-1 through 60-3 exchange. Due to the OLT 30 transmitting downstream control signals as control signals to the respective ONUs 60, the OLT 30 can send commands to the respective ONUs 60. Further, by receiving upstream control signals as control signals from the respective ONUs 60, the OLT 30 can know of the statuses of the respective ONUs 60. In order to carry out stable communications at the PON, these control signals needs to be transmitted and received periodically between the OLT 30 and the respective ONUs 60.

The transmission plan preparation unit 42 monitors the transmission buffer section 34 and prepares transmission plans. The transmission plans specify, in accordance with the downstream data signals accumulated in the transmission buffer section 34, the transmitting timings of the downstream control signals and the downstream data signals to the respective ONUs 60, e.g., the arrival times (receiving start times) and continuing time periods of the downstream control signals and downstream data signals. In a case in which a downstream control signal and a downstream data signal are each transmitted one time in each predetermined time period T, it is preferable for the transmission plan to include information of the arrival time and the continuing time period of the next downstream data signal and the arrival time and the continuing time period of the next downstream control signal. The control signal generation unit 44 generates downstream control signals that include the transmission plans.

Note that the transmission plan is not limited to this structure. For example, the information of the reception stop time of a downstream data signal may be used instead of the information of the continuing time period of a downstream data signal, and the information of the reception stop time of a downstream control signal may be used instead of the information of the continuing time period of a downstream control signal. Further, during one time period T, the transmission of downstream data signal to one ONU may be carried out over plural times. In this case, information of the downstream data signal of the plural times is included in the transmission plan.

The transmitting section 36 assigns, to the downstream data signals and the downstream control signals, identifiers that indicate the destination ONUs 60. These identifiers are allocated individually to the respective ONUs 60. By using the identifier, each ONU 60 identifies whether or not received downstream signals (a downstream data signal or a downstream control signal) are addressed to itself.

After assigning identifiers to the downstream signals, the transmitting section 36 converts the downstream electric signals, that include the downstream data signals and downstream control signals, into downstream optical signals. The transmitting section 36 sends the downstream optical signals out toward the ONUs in accordance with the transmission plans prepared by the transmission plan preparation unit 42.

Each of the ONUs 60 consist of the receiving section 62, a subscriber-side control section 80, the interface converting section 64, a timer 68, the electricity supply section 66, and a switch 70. Note that each of the ONUs 60 may be structured to have a semiconductor chip on which the receiving section 62, the subscriber-side control section 80, the interface converting section 64, the timer 68, the electricity supply section 66, and the switch 70 are implemented.

The receiving section 62 has a photoelectric converting function, a signal extracting function, and a signal sorting function. The photoelectric converting function is the function of converting downstream optical signals that are received from the OLT 30 into downstream electric signals.

The signal extracting function is the function of reading the identifiers included in the converted downstream electric signals, extracting signals that are addressed to itself, and discarding signals addressed to other ONUs. The extracting and discarding of signals are carried out by comparing the identifier included in the downstream electric signals with the identifier allocated to itself. If both match, the downstream electric signal is judged to be a signal addressed to itself and is extracted. On the other hand, if the both do not match, the downstream electric signal is judged to be a signal addressed to other ONUs and is discarded.

Further, the signal sorting function is the function of sorting the signals addressed to itself into downstream control signals and downstream data signals, and sending the downstream control signals to the subscriber-side control section 80, and sending the downstream data signals to the interface converting section 64. The judgment as to whether a signal is a downstream control signal or a downstream data signal may be made as follows: for example, when the downstream signal is generated at the OLT, an identifier that distinguishes between the both may be given to, for example, the preamble portion of the transmission signal, and that identifier may be judged at the ONU 60.

The interface converting section 64 converts the downstream data signals into the format that is defined by the communications protocol with the user equipment 90. The converted downstream data signals are sent to the user equipment 90.

The subscriber-side control section 80 has a transmission plan reading unit 82 and a timer control signal generation unit 84. The transmission plan reading unit 82 reads the transmission plan included in the downstream control signal. The timer control signal generation unit 84 refers to the transmission plan, and generates timer control signals that include information of the receiving start times and the receiving stop times of the downstream optical signals that are addressed to itself The generated timer control signals are sent to the timer 68.

Based on the timer control signals, the timer 68 generates switch control signals that switch the on/off state of the switch 70. The generated switch control signals are sent to the switch 70.

The switch 70 is placed between the electricity supply section 66 and the receiving section 62. In accordance with the command of the switch control signal, the switch 70 switches the opening/closing of the path that connects the receiving section 62 and the electricity supply section 66, i.e., switches the on/off state of the supply of electricity to the receiving section 62. Note that the electricity supply section 66 may be a power supply that is exclusively used for the receiving section 62, or may also serve as the power supply for other portions.

Note that, from the start of the supplying of electricity to the receiving section 62, there is a possibility that it takes some time until the receiving section 62 fully operates, or that a time difference may arise due to the accuracy of the timer 68 or the like. Thus, the timer control signal generation unit 84 may be organized so as to generate the timer control signals while providing a margin to the times that are described in the transmission plan.

The above-described PON of the present exemplary embodiment differs from a conventional PON with respect to the point that the OLT generates transmission plans, and the ONU carries out switching of the on/off state of the supply of electricity to the receiving section based on the transmission plan. The function of preparing the transmission plans and the function of reading the transmission plans can be realized by executing programs at the station-side control section and the subscriber-side control section. Accordingly, the function of preparing the transmission plans and the function of reading the transmission plans can be realized by using a program that adds the function of carrying out preparation or reading of the transmission plans to the conventional function of carrying out preparation of control signals or reading of commands. Further, arbitrary and appropriate structures that are conventionally known can be used for the timer, the switch, and the like.

(Power Supply Controlling Method)

Figure 2:
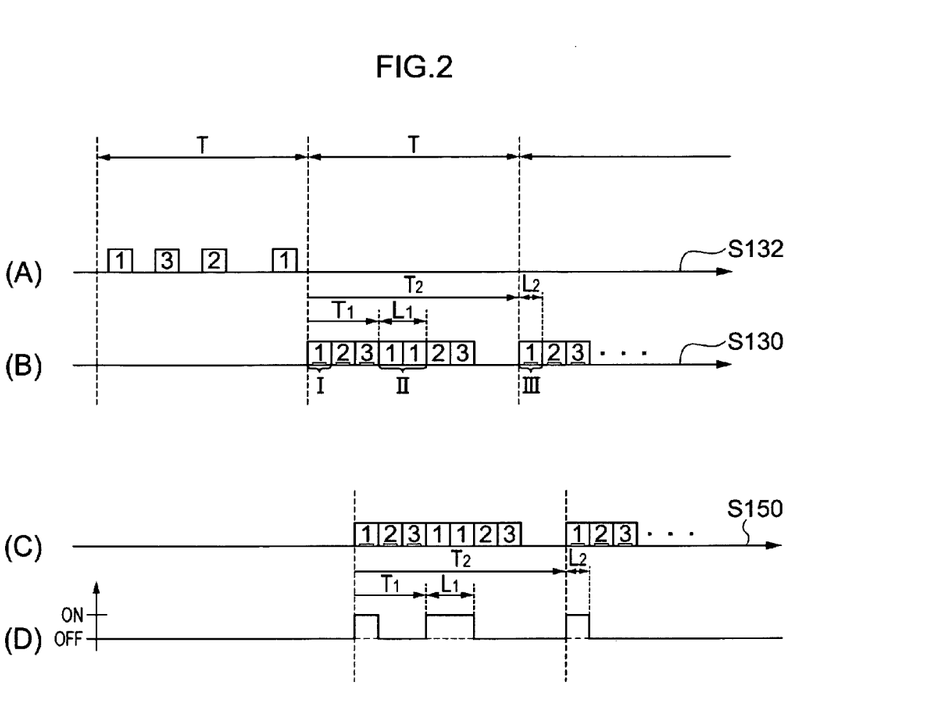
FIG. 2 shows timing charts for explaining a power supply controlling method.

A power supply controlling method in an optical communications network is described with reference to FIG. 1 and FIG. 2. In FIG. 2, (A) through (D) are timing charts for explaining the power supply controlling method. In FIG. 2, (A) through (D), time is illustrated on the horizontal axis.

FIG. 2 (A) shows the downstream data signals (shown by arrow S132 in FIG. 1) that arrive at the transmission buffer section 34 through the interface converting section 32 from the external network 20. The numbers written in FIG. 2 (A) correspond to the identifiers of the addressees. The downstream data signal to which "1" is applied is a signal addressed to the first ONU 60-1, the downstream data signal to which "2" is applied is a signal addressed to the second ONU 60-2, and the downstream data signal to which "3" is applied is a signal addressed to the third ONU 60-3. The downstream data signals S132 that arrive at the transmission buffer section 34 are accumulated in the transmission buffer section 34 during the predetermined time period T.

The transmission plan preparation unit 42 of the station-side control section 40 monitors the transmission buffer section 34. The transmission plan preparation unit 42 determines the order of transmission of the downstream data signals accumulated during the predetermined time period T. For example, the transmission order is determined such that, among the downstream data signals accumulated in the transmission buffer section 34, the downstream data signals addressed to the first ONU 60-1 are continuously transmitted, and thereafter, the downstream data signals addressed to the second ONU 60-2 are transmitted, and finally, the downstream data signals addressed to the third ONU 60-3 are transmitted. The transmission plan preparation unit 42 prepares the transmission plans in accordance with the transmission order. For example, the transmission plan includes the information of time T1 at which the corresponding ONU 60 receives the next downstream data signal and continuing time period L1 of that downstream data signal, and time T2 at which the corresponding ONU 60 receives the next downstream control signal and continuing time period L2 of that downstream control signal.

The control signal generation unit 44 of the station-side control section 40 generates downstream control signals that include the transmission plans. The transmitting section 36 carries out transmission of the downstream signals in accordance with the transmission plans prepared by the transmission plan preparation unit 42.

FIG. 2 (B) shows the downstream signals (shown by arrow S130 in FIG. 1) that are transmitted from the OLT 30 toward the ONUs 60. In the same way as in FIG. 2 (A), the numbers written in FIG. 2 (B) correspond to the identifiers of the addressee ONUs. Further, at the control signals, the numbers indicating the identifiers are underlined. FIG. 2 (B) shows signals whose identifiers are "1", i.e., the transmission plan for the first ONU 60-1.

The transmission plan that the downstream control signal (I) whose identifier is "1" has includes the arrival time T1 of the downstream data signal (II), whose identifier is "1" and that is to be sent next, and the continuing time period L1 thereof, and the arrival time T2 of the downstream control signal (III), whose identifier is "1" and that is to be sent next, and the continuing time period L2 thereof.

FIG. 2 (C) shows the downstream signals (shown by arrow S150 in FIG. 1) that the first ONU 60-1 receives. In the same way as in FIG. 2 (A), the numbers written in FIG. 2 (C) correspond to the identifiers of the destination ONUs. Further, at the control signals, the numbers indicating the identifiers are underlined.

The downstream signals that the first ONU 60-1 receives include the same information as the signals that the OLT 30 transmitted. However, the signal strength has reduced due to the branching at the optical splitter 50 and the transmission over the optical fiber.

The receiving section 62 sends the downstream control signal addressed to itself to the subscriber-side control section 80. The transmission plan reading unit 82 of the subscriber-side control section 80 reads the transmission plan that is included in the downstream control signal. Based on the read transmission plan, the timer control signal generation unit 84 generates timer control signals that include information of the receiving start times and the receiving stop times of the signals addressed to itself. These timer control signals are sent to the timer 68.

The timer 68 is always clocking time, and generates switch control signals that turn the switch 70 on at the receiving start time of a signal addressed to itself and turn the switch 70 off at the receiving stop time. These switch control signals are sent to the switch 70. In accordance with the switch control signals, the switch 70 switches the on/off state, and opens and closes the path that connects the receiving section 62 and the electricity supply section 66.

FIG. 2 (D) shows the state of the supply of electricity to the receiving section 62 of the first ONU 60-1. At the first ONU 60-1, while receiving a signal addressed to itself, i.e., a signal whose identifier is "1", electricity is supplied to the receiving section 62 (ON). While signals whose identifier is not "1" are being received, or while signals whose identifier is "1" are not being received such as when signals are not being received or the like, electricity is not supplied to the receiving section 62 (OFF). The switching of the on/off state of the supplying of electricity is carried out based on the transmission plan included in the control signal.

Note that, if the ONU has not received a downstream signal from the OLT even one time, the ONU maintains the supply of electricity to the receiving section ON, and awaits receipt of a downstream control signal addressed to itself. After receiving a downstream control signal addressed to itself that includes a transmission plan, the ONU switches the on/off state of supplying of electricity to the receiving section in accordance with the above-described power supply controlling method.

In accordance with the above-described optical communications network and power supply controlling method in an optical communications network, the station-side equipment prepares transmission plans and sends control signals including the transmission plans to the subscriber-side equipments. At the subscriber-side equipment, based on the transmission plan, the on/off state of the supplying of electricity to the receiving section is switched. Namely, the subscriber-side equipment learns in advance when the next downstream signal (data signal/control signal) addressed to itself will arrive, and can switch the on/off state of the supplying of electricity to the receiving section. Due thereto, the subscriber-side equipment supplies electricity to the receiving section only while downstream signals addressed to itself are being received, and stops supplying of electricity to the receiving section when downstream signals addressed to itself are not being received.

As a result, the power consumption of the subscriber-side equipment can be reduced as compared with a conventional network that always supplies electricity to the receiving section. Further, because electricity is supplied to the receiving section while a downstream signal addressed to itself are arriving, loss of downstream signals addressed to itself does not occur.

Although the above exemplary embodiments describe a TDM-POM that uses TDM technology as the optical communications network, the present invention is not limited to the same. The optical communications network and the power supply controlling method thereof can be applied as well to networks that combine TDM and WDM, networks that combine TDM and CDM, and the like.

Embodiments of the present invention are described above, but the present invention is not limited to the embodiments as will be clear to those skilled in the art.

What is claimed is:

1. An optical communications network that consists of one station-side equipment being connected to a plurality of subscriber-side equipments,
   the station-side equipment comprising:
      a transmission buffer section that accumulates downstream data signals received from an external network;
      a station-side control section that comprises a transmission plan preparation unit that monitors the transmission buffer section and prepares transmission plans, and a control signal generation unit that generates downstream control signals that include the transmission plans; and
      a transmitting section that assigns, to the downstream data signals and the downstream control signals, identifiers that indicate the destination subscriber-side equipments, and converts downstream signals, that include the downstream data signals and the downstream control signals, into downstream optical signals, and sends the downstream optical signals out toward the subscriber-side equipments in accordance with the transmission plans, and
   each of the plurality of subscriber-side equipments comprising:
      a receiving section that converts downstream optical signals, that are received from the station-side equipment, into downstream electric signals, and refers to identifiers assigned thereto and extracts downstream electric signals addressed to itself, and sends downstream control signals, that are included in the extracted downstream electric signals, to a subscriber-side control section;
      the subscriber-side control section that comprises a transmission plan reading unit that reads the transmission plans included in the downstream control signals, and a timer control signal generation unit that generates timer control signals including information of receiving start times and receiving stop times of downstream optical signals addressed to itself;
      a timer that generates switch control signals that switch on/off a switch on the basis of the timer control signals;
      an electricity supply section; and
      the switch that is provided between the receiving section and the electricity supply section, and that, on the basis of the switch control signals, opens and closes a path connecting the receiving section and the electricity supply section.

2. The optical communications network of claim 1, wherein the transmission plans include, for each subscriber-side equipment, a receiving start time and a continuing time period of a downstream optical signal addressed to the subscriber-side equipment.

3. The optical communications network of claim 1, wherein the transmission plans include, for each subscriber-side equipment, a receiving start time and a receiving stop time of a downstream optical signal addressed to the subscriber-side equipment.

4. A power supply controlling method in an optical communications network that consists of one station-side equipment being connected to a plurality of subscriber-side equipments, the method comprising:
   at the station-side equipment, accumulating downstream data signals received from an external network;
   at the station-side equipment, referring to accumulated downstream data signals, and preparing transmission plans;
   at the station-side equipment, generating downstream control signals that include the transmission plans;
   at the station-side equipment, assigning, to the downstream data signals and the downstream control signals, identifiers that indicate addressing subscriber-side equipments;
   at the station-side equipment, converting downstream signals, that include the downstream data signals and the downstream control signals, into downstream optical signals;
   at the station-side equipment, sending the downstream optical signals out toward the subscriber-side equipments in accordance with the transmission plans;
   at the subscriber-side equipment, converting downstream optical signals, that are received from the station-side equipment, into downstream electric signals;
   at the subscriber-side equipment, referring to identifiers assigned thereto and extracting downstream electric signals addressed to itself;
   at the subscriber-side equipment, reading the transmission plans included in the downstream control signals that are included in the extracted downstream electric signals;
   at the subscriber-side equipment, generating timer control signals including information of receiving start times and receiving stop times of downstream optical signals addressed to itself; and at the subscriber-side equipment, on the basis of the timer control signals, opening and closing a path connecting a receiving section and an electricity supply section that are provided at the subscriber-side equipment.

5. The power supply controlling method of claim 4, wherein the transmission plans include, for each subscriber-side equipment, a receiving start time and a continuing time period of a downstream optical signal addressed to the subscriber-side equipment.

6. The power supply controlling method of claim 4, wherein the transmission plans include, for each subscriber-side equipment, a receiving start time and a receiving stop time of a downstream optical signal addressed to the subscriber-side equipment.

7. A subscriber-side equipment among a plurality of subscriber-side equipments that are connected to a station-side equipment and comprise an optical communications network, the station-side equipment transmitting downstream optical signals to the subscriber-side equipments, the downstream optical signals including downstream data signals received from an external network and downstream control signals including transmission plans, identifiers that indicate the destination subscriber-side equipments being assigned to the downstream data signals and the downstream control signals, the subscriber-side equipment comprising:

a receiving section that converts downstream optical signals, that are received from the station-side equipment, into downstream electric signals, and refers to identifiers assigned thereto and extracts downstream electric signals addressed to itself, and sends downstream control signals, that are included in the extracted downstream electric signals, to a subscriber-side control section;

the subscriber-side control section that comprises a transmission plan reading unit that reads the transmission plans included in the downstream control signals, and a timer control signal generation unit that generates timer control signals including information of receiving start times and receiving stop times of downstream optical signals addressed to itself;

a timer that generates switch control signals that switch on/off a switch on the basis of the timer control signals;

an electricity supply section; and the switch that is provided between the receiving section and the electricity supply section, and that, on the basis of the switch control signals, opens and closes a path connecting the receiving section and the electricity supply section.

8. The subscriber-side equipment of claim 7, wherein the transmission plans include, for each subscriber-side equipment, a receiving start time and a continuing time period of a downstream optical signal addressed to the subscriber-side equipment.

9. The subscriber-side equipment of claim 7, wherein the transmission plans include, for each subscriber-side equipment, a receiving start time and a receiving stop time of a downstream optical signal addressed to the subscriber-side equipment.

10. A semiconductor chip implemented on a subscriber-side equipment among a plurality of subscriber-side equipments that are connected to a station-side equipment and comprise an optical communications network, the station-side equipment transmitting downstream optical signals to the subscriber-side equipments, the downstream optical signals including downstream data signals received from an external network and downstream control signals including transmission plans, identifiers that indicate the destination subscriber-side equipments being assigned to the downstream data signals and the downstream control signals, the semiconductor chip comprising:

a receiving section that converts downstream optical signals, that are received from the station-side equipment, into downstream electric signals, and refers to identifiers assigned thereto and extracts downstream electric signals addressed to itself, and sends downstream control signals, that are included in the extracted downstream electric signals, to a subscriber-side control section;

the subscriber-side control section that comprises a transmission plan reading unit that reads the transmission plans included in the downstream control signals, and a timer control signal generation unit that generates timer control signals including information of receiving start times and receiving stop times of downstream optical signals addressed to itself;

a timer that generates switch control signals that switch on/off a switch on the basis of the timer control signals;

an electricity supply section; and the switch that is provided between the receiving section and the electricity supply section, and that, on the basis of the switch control signals, opens and closes a path connecting the receiving section and the electricity supply section.

11. The semiconductor chip of claim 10, wherein the transmission plans include, for each subscriber-side equipment, a receiving start time and a continuing time period of a downstream optical signal addressed to the subscriber-side equipment.

12. The semiconductor chip of claim 10, wherein the transmission plans include, for each subscriber-side equipment, a receiving start time and a receiving stop time of a downstream optical signal addressed to the subscriber-side equipment.

* * * * *